United States Patent
Loga et al.

(10) Patent No.: US 10,317,003 B2
(45) Date of Patent: Jun. 11, 2019

(54) DOUBLE BLOCK AND BLEED SYSTEM FOR AN ORIFICE FITTING

(71) Applicant: Daniel Measurement and Control, Inc., Houston, TX (US)

(72) Inventors: Thomas Henry Loga, Sugar Land, TX (US); Justin Blake Crouch, Cypress, TX (US)

(73) Assignee: Daniel Measurement and Control, Inc., Houston, TX (US)

( * ) Notice: Subject to any disclaimer, the term of this patent is extended or adjusted under 35 U.S.C. 154(b) by 327 days.

(21) Appl. No.: 14/806,368

(22) Filed: Jul. 22, 2015

(65) Prior Publication Data

US 2017/0023166 A1   Jan. 26, 2017

(51) Int. Cl.
*F16K 1/44* (2006.01)
*F16K 3/02* (2006.01)
(Continued)

(52) U.S. Cl.
CPC ............ *F16L 55/07* (2013.01); *F16K 3/0254* (2013.01); *F16K 3/30* (2013.01); *F16K 3/314* (2013.01);
(Continued)

(58) Field of Classification Search
CPC ... Y10T 1/0452; Y10T 1/4358; Y10T 1/4245; Y10T 1/4249; Y10T 1/4266;
(Continued)

(56) References Cited

U.S. PATENT DOCUMENTS

| 646,104 | A | * | 3/1900 | Faber | ...................... F16K 1/446 |
| | | | | | 137/240 |
| 870,487 | A | * | 11/1907 | Betram | .................... F16K 1/446 |
| | | | | | 137/240 |

(Continued)

FOREIGN PATENT DOCUMENTS

| DE | 2505544 C2 | * | 9/1981 | ............. F16K 1/385 |
| GB | 2273337 A | * | 6/1994 | ........... F16K 3/0227 |

(Continued)

OTHER PUBLICATIONS

Chinese Patent Application No. 201520631904.4 First Notification of Making Rectification dated Dec. 1, 2015 (3 pages).

*Primary Examiner* — Reinaldo Sanchez-Medina
*Assistant Examiner* — Hailey K. Do
(74) *Attorney, Agent, or Firm* — Conley Rose, P.C.

(57) ABSTRACT

An orifice fitting includes a body, an orifice plate mounted in the body, and an orifice plate transfer passage within the body. The orifice plate transfer passage includes a shoulder, and the orifice plate is movable through the passage. In addition, the orifice fitting includes a sealing assembly disposed in the orifice plate transfer passage. The sealing assembly includes a sealing insert including a first section and a second section. In addition, the sealing assembly includes a first sealing member configured to create a first fluid tight barrier between the second section and the orifice plate transfer passage. Further, the sealing assembly includes a second sealing member configured to create a second fluid tight barrier between the shoulder and the first section. Still further, the sealing assembly includes a sub-chamber within the orifice plate transfer passage between the first fluid tight barrier and the second fluid tight barrier.

18 Claims, 17 Drawing Sheets

(51) Int. Cl.
*F16K 3/30* (2006.01)
*F16K 3/314* (2006.01)
*F16L 55/07* (2006.01)
*G01F 1/42* (2006.01)
*F16L 41/00* (2006.01)

(52) U.S. Cl.
CPC ................ *G01F 1/42* (2013.01); *F16K 1/443* (2013.01); *F16K 1/446* (2013.01); *F16K 3/0218* (2013.01); *F16K 3/0227* (2013.01); *F16L 41/008* (2013.01)

(58) Field of Classification Search
CPC ....... Y10T 137/86509; Y10T 137/0452; Y10T 137/4358; Y10T 137/4245; Y10T 137/4249; Y10T 137/4266; F16K 1/24; F16K 1/443; F16K 1/446; F16K 3/00; F16K 3/02; F16K 3/0218; F16K 3/0227; F16K 27/08; F16K 39/02; F16K 39/04; F16K 43/001; F16K 11/02; F16K 11/022; F16K 11/025; F16K 1/36; F16K 1/44
See application file for complete search history.

(56) References Cited

U.S. PATENT DOCUMENTS

| | | | | |
|---|---|---|---|---|
| 2,622,838 A * | 12/1952 | Stevenson | .................. | F16K 1/02 137/246.22 |
| 3,665,952 A * | 5/1972 | Chronister | .............. | F16K 11/02 137/246 |
| 3,765,647 A * | 10/1973 | Grove | .................. | F16K 3/0227 251/317 |
| 5,050,842 A * | 9/1991 | Foster | ................... | F16K 3/0227 251/176 |
| 5,305,796 A * | 4/1994 | Klak | ......................... | G01F 1/42 138/40 |
| 5,967,166 A * | 10/1999 | Carter | ..................... | E21B 34/04 137/1 |
| 6,871,666 B1 * | 3/2005 | Loga | ..................... | F16K 3/0209 137/2 |
| 7,063,107 B2 * | 6/2006 | Loga | ..................... | F16K 3/0254 138/44 |
| 7,357,371 B2 * | 4/2008 | Tatum | ................... | F16K 3/0227 251/301 |
| 8,161,825 B2 * | 4/2012 | Loga | ......................... | G01F 1/42 73/861.61 |
| 8,815,616 B2 * | 8/2014 | Bang | ...................... | F16K 51/02 118/686 |
| 2012/0055400 A1 * | 3/2012 | Hiroki | ...................... | F16K 1/24 118/620 |
| 2015/0060716 A1 * | 3/2015 | Picot | ...................... | F16K 1/446 251/334 |
| 2016/0258539 A1 * | 9/2016 | Langenegger | .......... | F16K 1/446 |

FOREIGN PATENT DOCUMENTS

WO    WO 2014040700 A1 *   3/2014   ............ F16K 1/446
WO    WO 2014124514 A1 *   8/2014   ............ G01F 1/42

\* cited by examiner

DOUBLE BLOCK AND BLEED SYSTEM FOR AN ORIFICE FITTING

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

In pipeline operations and other industrial applications, orifice flow meters are used to measure the volumetric flow rate of a gaseous or liquid flow stream moving through a piping section or conduit. Specifically, an orifice plate including a central orifice which is smaller than the inner diameter of the adjacent piping section is suspended within the flow meter such that fluid flowing along the piping section is forced through the central orifice thereby resulting in a pressure differential across the plate. This pressure different can be measured (e.g., by pressure transducers and/or the like) and used to calculate the volumetric flow rate of fluid flowing through the flow meter.

BRIEF SUMMARY OF THE DISCLOSURE

Some embodiments disclosed herein are directed to an orifice fitting. In an embodiment, the orifice fitting includes a body, an orifice plate mounted in the body, and an orifice plate transfer passage within the body. The orifice plate transfer passage includes a shoulder, and the orifice plate is movable through the orifice plate transfer passage. In addition, the orifice fitting includes a sealing assembly disposed in the orifice plate transfer passage. The sealing assembly includes a sealing insert including a first section and a second section. In addition, the sealing assembly includes a first sealing member configured to create a first fluid tight barrier between the second section and the orifice plate transfer passage. Further, the sealing assembly includes a second sealing member configured to create a second fluid tight barrier between the shoulder and the first section. Still further, the sealing assembly includes a subchamber within the orifice plate transfer passage between the first fluid tight barrier and the second fluid tight barrier.

Other embodiments disclosed herein are directed to a method for one of removing and installing an orifice plate within an orifice fitting. In an embodiment, the method includes (a) opening a bottom valve of a pair of valves disposed in an orifice plate transfer passage extending within the fitting. The pair of valves are disposed above an orifice plate that is in fluid communication with a pipeline. In addition, the method includes (b) maintaining a lower valve of the pair of valves in a closed position. Further, the method includes (c) forming a pair of fluid tight barriers with a sealing insert disposed above the first pair of valves and in the orifice plate transfer passage. A first of the fluid tight barriers is formed between a first section of a sealing insert and a shoulder in the orifice plate transfer passage, and a second of the fluid tight barriers is formed between a second section of the sealing insert and the orifice plate transfer passage. The first section is disposed above the second section within the orifice plate transfer passage. Still further, the method includes (d) opening a lower valve of the pair of valves after (a), (e) moving the orifice plate within the orifice plate transfer passage to a position between the pair of valves and the sealing insert, and (f) closing the lower valve and the bottom valve after (e).

Still other embodiments disclosed herein are directed to an orifice fitting. In an embodiment, the orifice fitting includes a body including an orifice plate transfer passage extending therein, an orifice plate disposed within the orifice plate transfer passage, and a sealing insert disposed in the orifice plate transfer passage. In addition, the orifice fitting includes a pair of fluid tight barriers within the orifice plate transfer passage that are configured to restrict a flow of fluid from the orifice fitting along the orifice plate transfer passage. Further, the orifice fitting includes a subchamber defined within the orifice plate transfer passage between the pair of fluid tight barriers. Still further, the orifice fitting includes a first vent valve in communication with the subchamber and configured to provide an outlet for fluid in the subchamber.

Embodiments described herein comprise a combination of features and advantages intended to address various shortcomings associated with certain prior devices, systems, and methods. The foregoing has outlined rather broadly the features and technical advantages of the disclosed embodiments in order that the detailed description that follows may be better understood. The various characteristics described above, as well as other features, will be readily apparent to those skilled in the art upon reading the following detailed description, and by referring to the accompanying drawings. It should be appreciated by those of ordinary skill in the art that the conception and the specific embodiments disclosed may be readily utilized as a basis for modifying or designing other structures for carrying out the same purposes as the disclosed embodiments. It should also be realized by those of ordinary skill in the art that such equivalent constructions do not depart from the spirit and scope of the principles disclosed herein.

BRIEF DESCRIPTION OF THE DRAWINGS

For a detailed description of various embodiments, reference will now be made to the accompanying drawings in which.

DETAILED DESCRIPTION OF EXEMPLARY EMBODIMENTS

Figure 1:
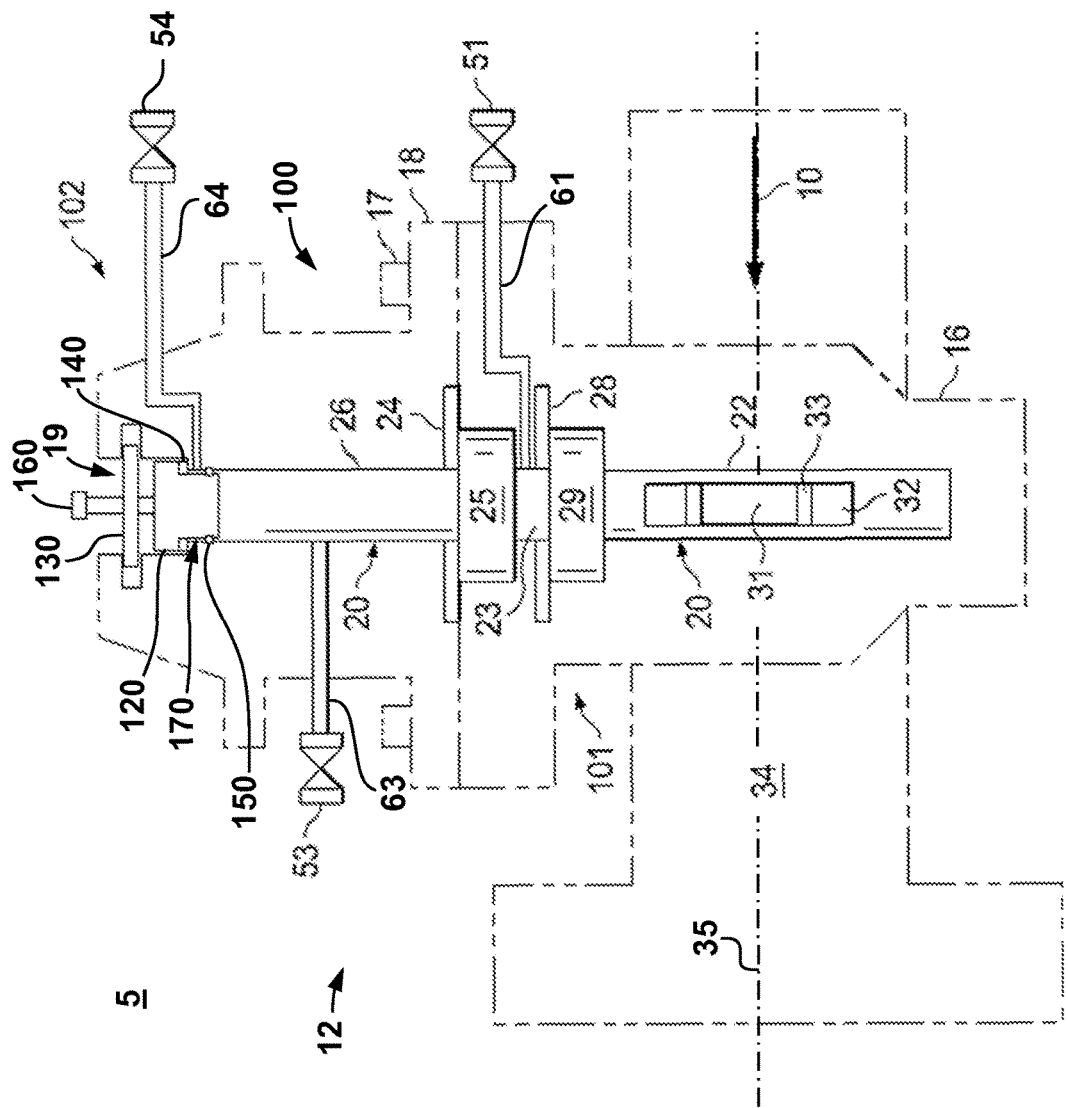
FIG. 1 is a partial sectional side view of an orifice fitting with a multi-double block and bleed system in accordance at least some embodiments.

The following discussion is directed to various exemplary embodiments. However, one skilled in the art will understand that the examples disclosed herein have broad application, and that the discussion of any embodiment is meant only to be exemplary of that embodiment, and not intended to suggest that the scope of the disclosure, including the claims, is limited to that embodiment.

The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices, components, and connections. In addition, as used herein, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis.

As previously described, an orifice flowmeter induces a pressure differential across an orifice plate having an orifice smaller than the inner diameter of the adjacent piping section. This pressure differential is measured and then used to determine the volumetric flow rate of fluid flowing through the piping section on which the flowmeter is installed. During these operations, the pressure within both the piping section and the flowmeter itself can be relatively high. In addition, at some point it may become necessary to remove the orifice plate from the flowmeter to facilitate replacement or repair thereof (e.g., due to wear of the orifice plate edges or to install a differently sized orifice plate). It is typically preferred to maintain flow through the associated piping section during these orifice plate replacement and/or removal operations. As a result, it is desirable to include systems and structures which provide one or more barriers for preventing fluid flowing within the piping section and flowmeter from escaping into the surrounding environment. It is further desirable that such systems and structures maintain the one or more fluid barriers during both normal flow and orifice plate replacement and/or removal operations. Thus, embodiments disclosed herein include orifice flowmeters with double block and bleed systems for preventing the unintentional release of fluid flowing through the associated piping section and flowmeter into the surrounding environment during orifice plate replacement and/or removal operations.

Referring now to FIG. 1, an example of a dual chamber orifice fitting or orifice flowmeter 12 is shown disposed along a pipeline or piping section 34. Orifice flowmeter 12 is located in a work area or environment 5 and includes a body 16 and a top 18. Top 18 encloses an upper chamber 26 and is secured to body 16 by bolts 17. Specifically, referring briefly to FIG. 2, top 18 includes an upper end 18a, a recess 19 extending vertically downward from upper end 18a toward chamber 26, and an annular shoulder 27 extending between recess 19 and chamber 26. Referring again to FIG. 1, body 16 encloses lower chamber 22, which is in fluid communication with the interior of piping section 34.

Referring still to FIG. 1, a flow stream or energy source, which may contain fluids (i.e., liquids and/or gases), flows through piping section 34 along direction 10. An orifice plate 33 is supported within chamber 22 by an orifice plate carrier 32 such that plate 33 is exposed to the fluids flowing through piping section 34. Plate 33 includes a central aperture or orifice 31 that extends therethrough. In this embodiment, orifice 31 is circularly shaped; however, other shapes are possible for use with embodiments disclosed herein. Notably, orifice 31 has a diameter that is smaller than the inner diameter of piping section 34. In addition, in this embodiment, plate 33 is positioned and supported within chamber 22 by carrier 32 such that orifice 31 is concentrically aligned with a central axis 35 of piping section 34; however, such alignment is not required. This position, where orifice 31 of plate 33 is aligned with axis 35 may be referred to herein as a metering position. During flow metering operations, as fluid flows through piping section 34 along direction 10, it is forced through orifice 31, thereby resulting in pressure differential across plate 33. This pressure differential is then measured (e.g., by pressure transducers—not shown—disposed along piping section 34 both upstream and downstream of plate 33) and the volumetric flow rate of fluid flowing through section 34 and meter 12 is then calculated or otherwise determined based, at least in part, on this this measured pressure differential.

Referring still to FIG. 1, flowmeter 12 also includes a multi-double block and bleed system 100 which provides pressure-regulated access to the flowmeter 12 during, before, and/or after the flow metering operations described above. As shown in FIG. 1, system 100 includes a pair of lower blocking valves 101 and an upper sealing assembly 102. In addition, system 100 includes a first or lower vent valve 51, a second or middle vent valve 53 disposed above lower vent valve 51, and a third or upper vent valve 54 disposed above both valves 51, 53.

Lower blocking valves 101 are disposed in the lower chamber 22 of the flowmeter 12 and include a top lower blocking valve 25 and a bottom lower blocking valve 29 disposed above top lower blocking valve 25. A lower blocking valve chamber 23 is formed between blocking valves 25, 29 and is in fluid communication with lower vent valve 51 via flow path 54. For simplicity, the top lower blocking valve 25 will hereafter be referred to as the lower blocking valve 25, and the bottom lower blocking valve 29 will hereafter be referred to as a the bottom blocking valve 29.

The first or lower pair of blocking valves 101 further include a bottom valve seat 28 disposed in lower chamber 22 and coupled to body 16 to provide a sealing engagement with bottom blocking valve 29. As a result, when bottom blocking valve 29 is closed, it blocks or prevents the fluid flowing through piping section 34 from flowing beyond the bottom blocking valve 29 within lower chamber 22. An upper valve seat 24 is disposed in upper chamber 26 above the bottom blocking valve 29 and coupled to top 18 to provide a sealing engagement with upper blocking valve 25. When lower blocking valve 25 is closed, it blocks or prevents the fluid flowing in piping section 34 from advancing beyond the lower blocking valve 25 within upper chamber 26. As one of ordinary skill will appreciate, the lower blocking valve 25 and bottom blocking valve 29 are slidably actuated by rotating gear shafts (not shown) such as those used in the Dual-Chamber Orifice Fittings available from Daniel Measurement and Control of Houston, Tex.

Figure 2:
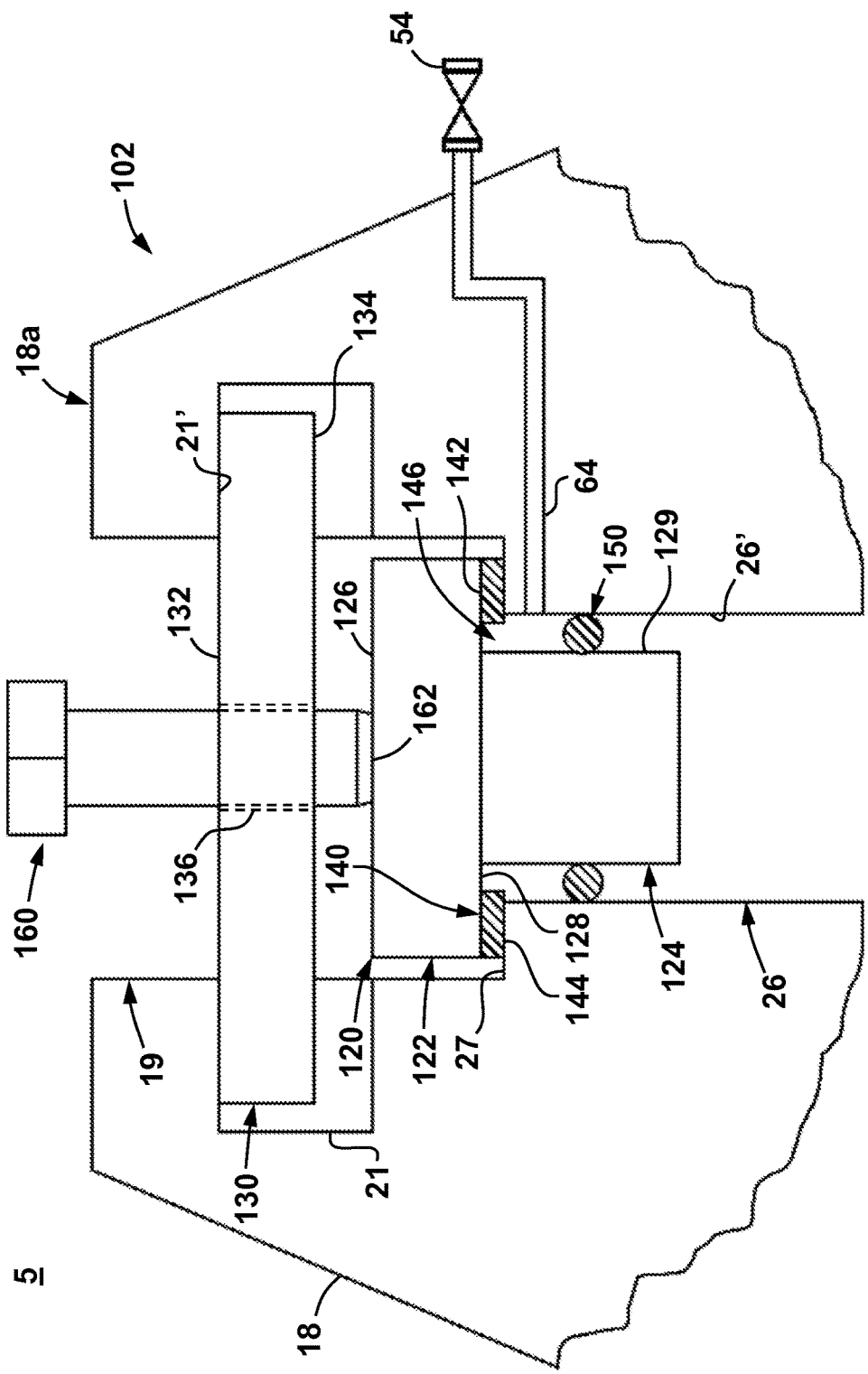
FIG. 2 is an enlarged partial sectional view of the upper seal assembly of the multi-double block and bleed system of FIG. 1.
Figure 3:
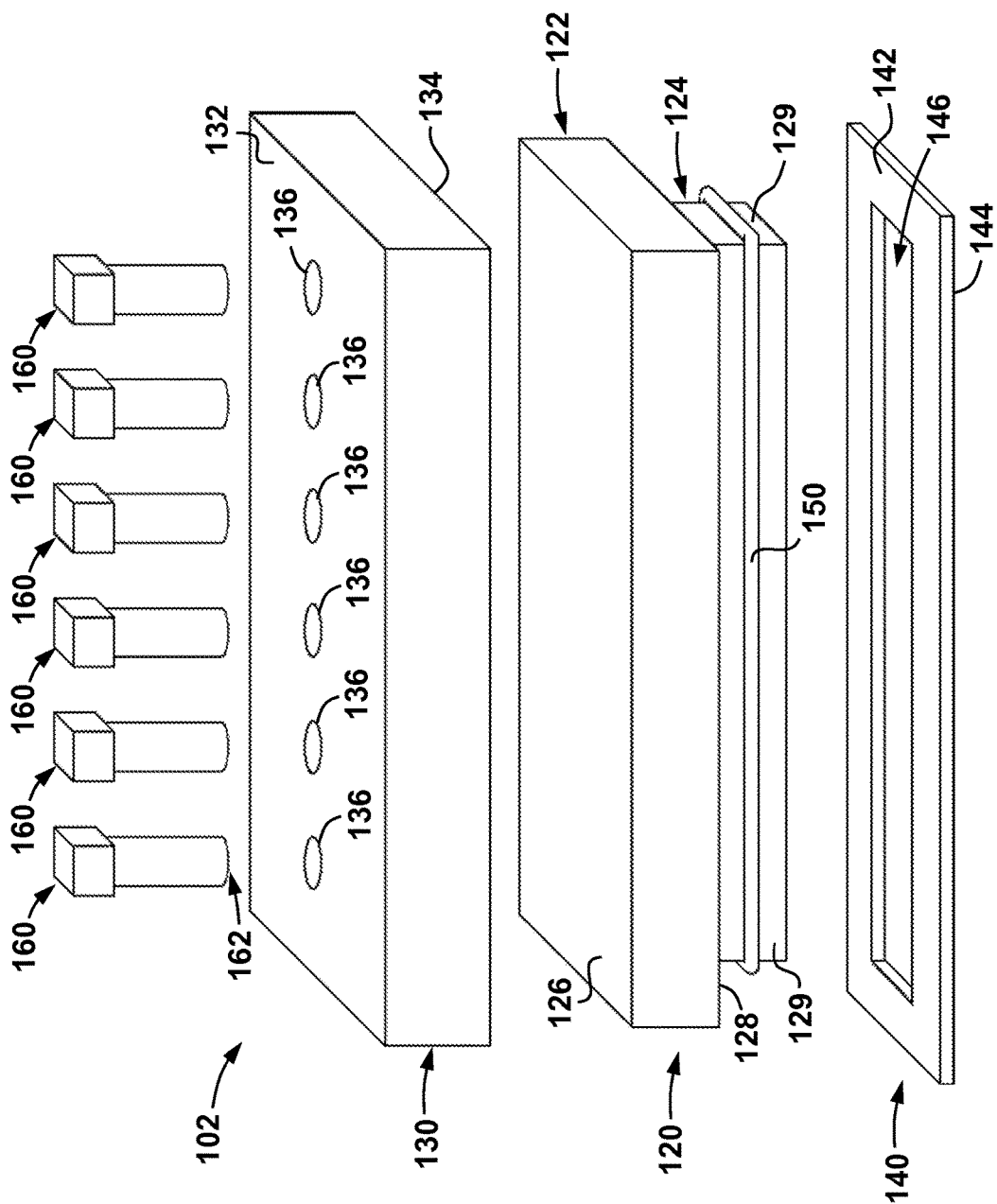
FIG. 3 is an exploded perspective view of the upper seal assembly of FIG. 2.

Referring now to FIGS. 2 and 3, upper sealing assembly 102 is disposed within chamber 26 and recess 19 and includes a sealing insert 120, a clamping member 130, a first sealing member 140, and a second sealing member 150. Sealing insert 120 is an elongate member that includes a first or upper section 122 and a second or lower section 124. Upper section 122 is generally rectangular in shape and includes a top engagement surface 126 and a lower engagement surface 128. Lower section 124 is also generally rectangular in shape and includes a plurality of side engagement surfaces 129 each extending from lower engagement surface 128 of upper section 122.

Clamping member 130 is generally rectangular in shape and includes an upper surface 132 and a lower surface 134 opposite upper surface 132. A plurality of through holes or apertures 136 extend through member 130 between upper surface 132 and lower surface 134. Each aperture 136 includes a plurality of female threads (not shown) that, as will be described in more detail below, are configured to engage with a plurality of male threads disposed along each of a plurality of engagement members 160 to secure insert 120 and member 130 within recess 19 and chamber 26 during operations.

As is best shown in FIG. 3, in this embodiment first sealing member 140 is a rectangular shaped gasket having a first or upper surface 142, a second or lower surface 144 opposite upper surface 142, and a central rectangular aperture 146 extending between upper surface 142 and lower surface 144. As will be described in more detail below, during operations, lower section 124 of insert 120 is inserted through aperture 146, and thus, aperture 146 is sized and shaped to receive lower section 124 during operations (i.e., aperture 146 is at least as large or larger than lower section 122). Sealing member 140 may be constructed out of any suitable material for creating a fluid tight seal when compressed between two other rigid surfaces. For example, in some embodiments, sealing member 140 comprises an elastomer, a polymer, graphite, metals (soft or hard).

Second sealing member 150 is an annular member that is configured to be placed about lower section 124 of sealing insert 120 during operations to restrict the flow of fluid to and from chamber 26 during operations. In this embodiment, sealing member 150 is generally rectangular in shape and is therefore configured to conform to side surfaces 129 of sealing insert 120.

Referring specifically to FIG. 2, during operations, first sealing member 140 is inserted within recess 19 from upper end 18a of top 18 until lower engagement surface 144 abuts or engages shoulder 27. Thereafter, second sealing member 150 is placed about lower section 124 of insert 120 in the manner shown in FIG. 3 and discussed above, and sealing insert 120 and second sealing member 150 are inserted through upper end 18a into recess 19 such that lower engagement surface 128 on insert 120 engages or abuts upper engagement surface 142 of sealing member 140. In addition, during this installation of insert 120 and member 150, lower section 124 is inserted through aperture 146 in first sealing member 140 and into upper chamber 26 such that second sealing member 150 is compressed (e.g., laterally) between side surfaces 129 on lower section 124 and an inner surface 26' of chamber 26. Therefore, it should be appreciated that inner surface 26' of chamber 26 is sized and shaped to conform with side surface 129 of lower section 124. This compression of second sealing member 150 between lower section 124 and chamber creates a first or primary fluid tight barrier that restricts the flow of fluids between chamber 26 and environment 5 during operations.

After the insert 120 is disposed within recess 19 and chamber 26 as described above, clamping member 130 is then inserted within a slot 21 formed within recess 19. Recess 19 further includes an engagement surface 21'. Engagement members 160, which in this embodiment comprise elongate screws, are then threadably engaged and advanced within apertures 136 until lower end 162 of each member 160 engages or abuts upper engagement surface 126 of insert 120. Thereafter, continued advancement of engagement members 160 within apertures 136 urges clamping member 130 and insert 120 vertically apart from one another within chamber 26 until upper engagement surface 132 of clamping member engages or abuts engagement surface 21' within slot 21. Further advancement of members 160 within apertures 136 then results in compression of sealing member 140 between engagement surface 128 and shoulder 127. Specifically, as insert 120 is forced vertically downward within chamber 26 via clamping member 130 and engagement members 160 as described above, upper surface 142 on sealing member 140 is compressed against lower engagement surface 128 and lower surface 144 on sealing member 140 is compressed against with shoulder 127. Thus, once compressed, sealing member 140 creates a secondary fluid tight barrier for restricting fluid flow between chamber 26 and environment 5 during operations. Therefore, upon the compression of each of the sealing members 140, 150 within recess 19 and chamber 26, respectively, a sealed buffer zone or central subchamber 170 is defined therebetween that communicates with upper vent valve 54 through an internal flow path 55.

Referring again to FIG. 1, the combination of the chambers, 22, 23, and 26, subchamber 17, and recess 19 forms an orifice plate transfer passage 20 through flowmeter 12. As will be described in more detail below, the transfer passage 20 allows for the removal and/or installation of plate 33 and/or carrier 32 during operations. In addition, as will also be described in more detail below, lower blocking valves 101, upper seal assembly 102, and vent valves 51, 53, 54 provide multiple pressure barriers and bleeding pathways to maintain a double block and bleed arrangement between the fluid flowing through piping section 34 and environment 5 during metering operations, as well as orifice plate 33 and/or carrier 32 removal and installation operations.

During flow metering operations, operators may monitor and detect failures of any of the barriers or blocks formed by either upper sealing assembly 102 or lower blocking valves 101. Specifically, during operation of flowmeter 12, an operator may determine whether a sealing failure has occurred in either one of the lower blocking valves 101 or upper sealing assembly 102 by monitoring one or more of the conditions within valve blocking chamber 23 and central subchamber 170 through valves 51, 54 and lines 61, 64, respectively. In addition, such a sealing failure of valves 101 or assembly 102 may also be detected through monitoring one or more of the conditions at vent valve 53, which is in fluid communication with chamber 26 at a point between upper seal assembly 102 and lower blocking valves 101 through a line 63.

During these monitoring and/or failure detection operations, the operator may simply open one or more of the vent valves 51, 53, 54 and observe the type of fluid emitted therefrom. For example, in some scenarios, the observation of fluids normally flowing within piping section 34 within either chamber 23 or subchamber 170 would indicate a failure of one or more of blocking valves 101 or sealing assembly (assuming valves 25, 29 are closed and/or sealing members 140, 150 are fully engages as described above) Alternatively, a sensor for measuring or detecting the presence of the fluid within piping section 34 may be disposed within or in communication with one or more of lines 61, 63, 64, which may output a signal which alerts the operator that a failure of one or more of the blocking valves 101, or seals within assembly (e.g., seals 140, 150) has occurred. Further, in other embodiments, a pressure sensor may additionally or alternatively be placed in communication with one or more of lines 61, 63, 64, to monitor any changes in the pressure of chamber 23, chamber 26, or subchamber 170, respectively. As one of ordinary skill in the art will appreciate, a change in pressure within chambers 23, 26, and/or subchamber 170 can indicate that one or both of the fluid tight barriers formed by blocking valves 101 and/or sealing assembly 102 has failed.

Figure 4:
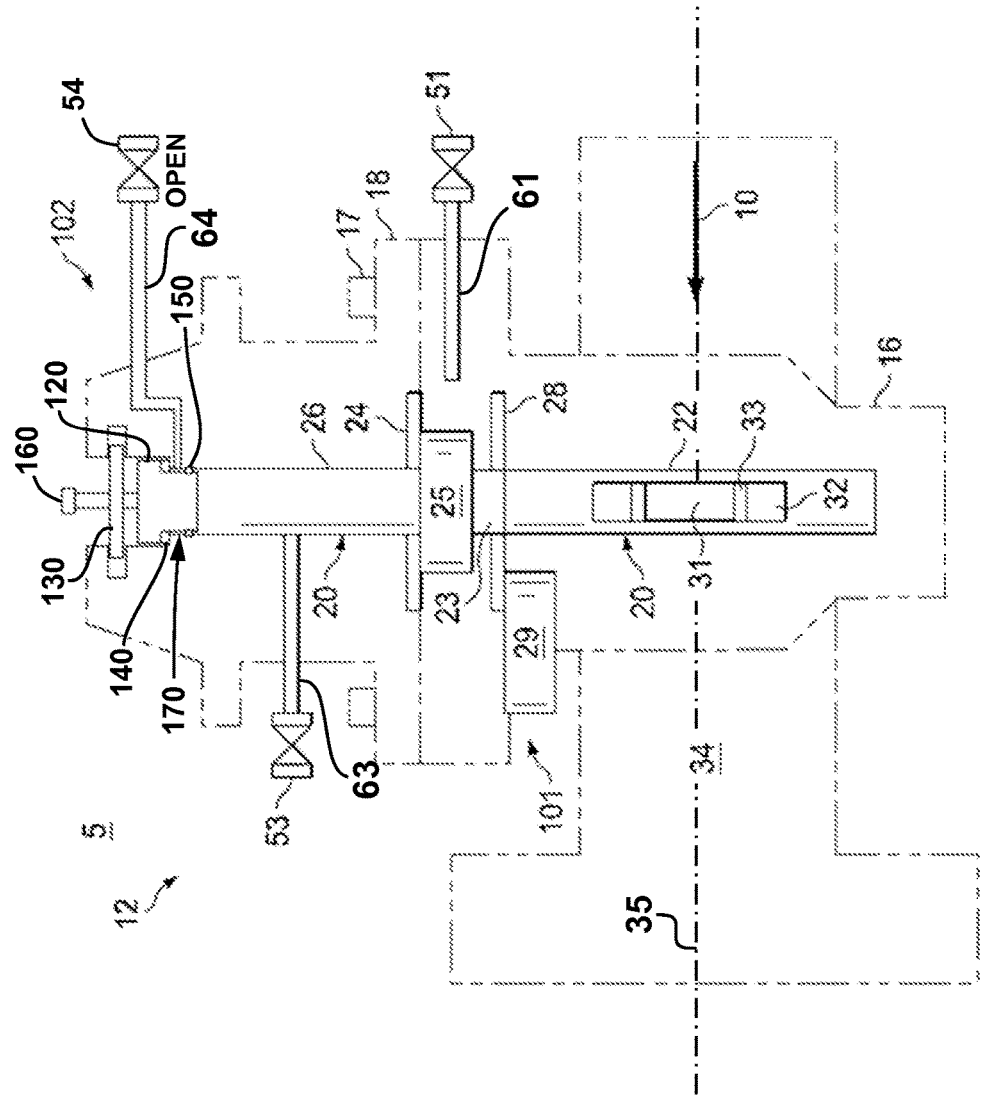
FIG. 4 is a partial sectional side view of the fitting and multi-double block and bleed system of FIG. 1 with a bottom blocking valve open.
Figure 5:
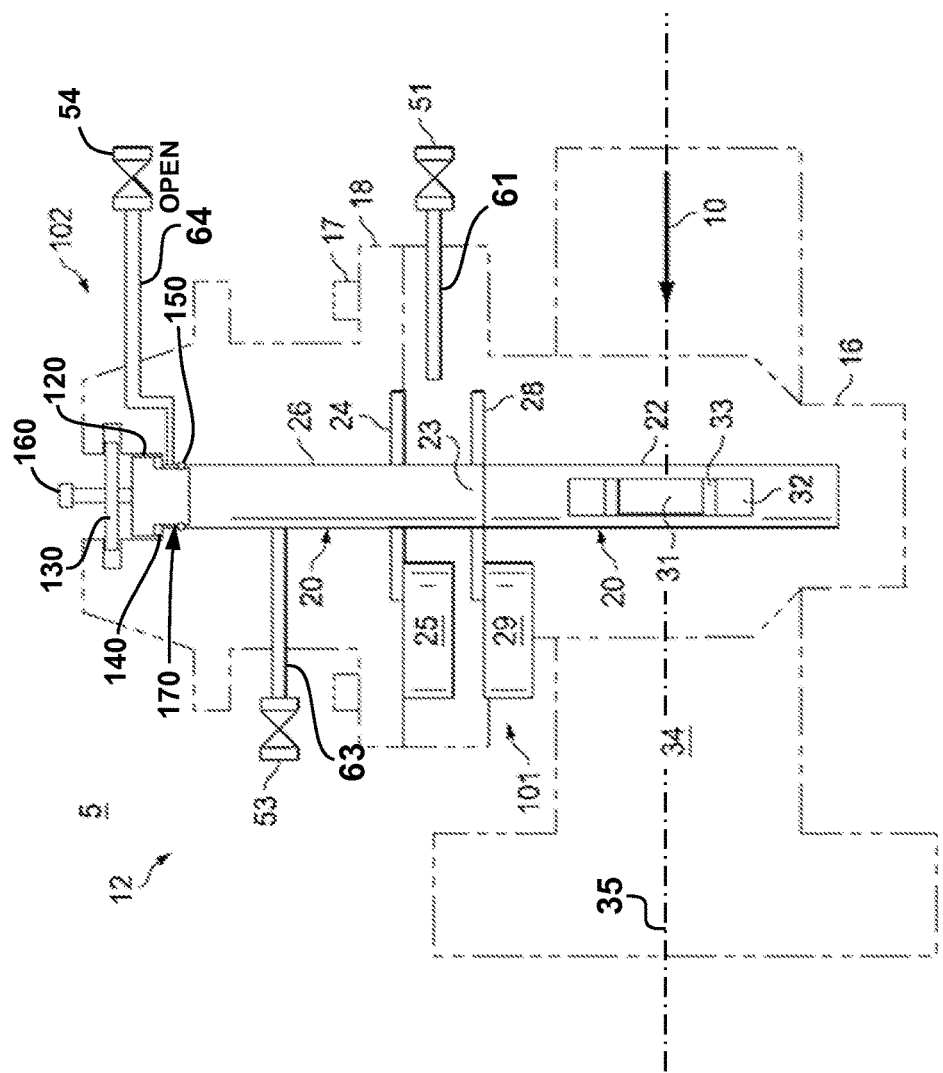
FIG. 5 is a partial sectional side view of the fitting and multi-double block and bleed system of FIG. 1 with the lower blocking valve and bottom blocking valve open.

At some point, it may become necessary or desirable to remove orifice plate 33 for servicing or replacement (e.g., if the edges of plate 33 become worn, or if a different sized orifice 31 is required for the fluid flowing with piping section 34, etc.). Specifically, referring now to FIGS. 4 and 5, to remove the orifice plate carrier 32 and plate 33 from flowmeter 12, the upper vent valve 54 is initially opened to vent the pressure in subchamber 170 between seals 140, 150 of insert 120. The bottom blocking valve 29 is then opened (FIG. 4), and then the lower blocking valve 25 is opened (FIG. 5), placing the interior of piping section 34 in fluid communication with lower blocking valve chamber 27 and the upper chamber 26, below the upper sealing assembly 102. The fluid tight barriers provided by seals 140, 150 on sealing insert 120 are still in place, thereby providing double block and bleed protection between the environment 5 and the fluid flowing in piping section 34 after blocking valves 25, 29 are opened.

Figure 6:
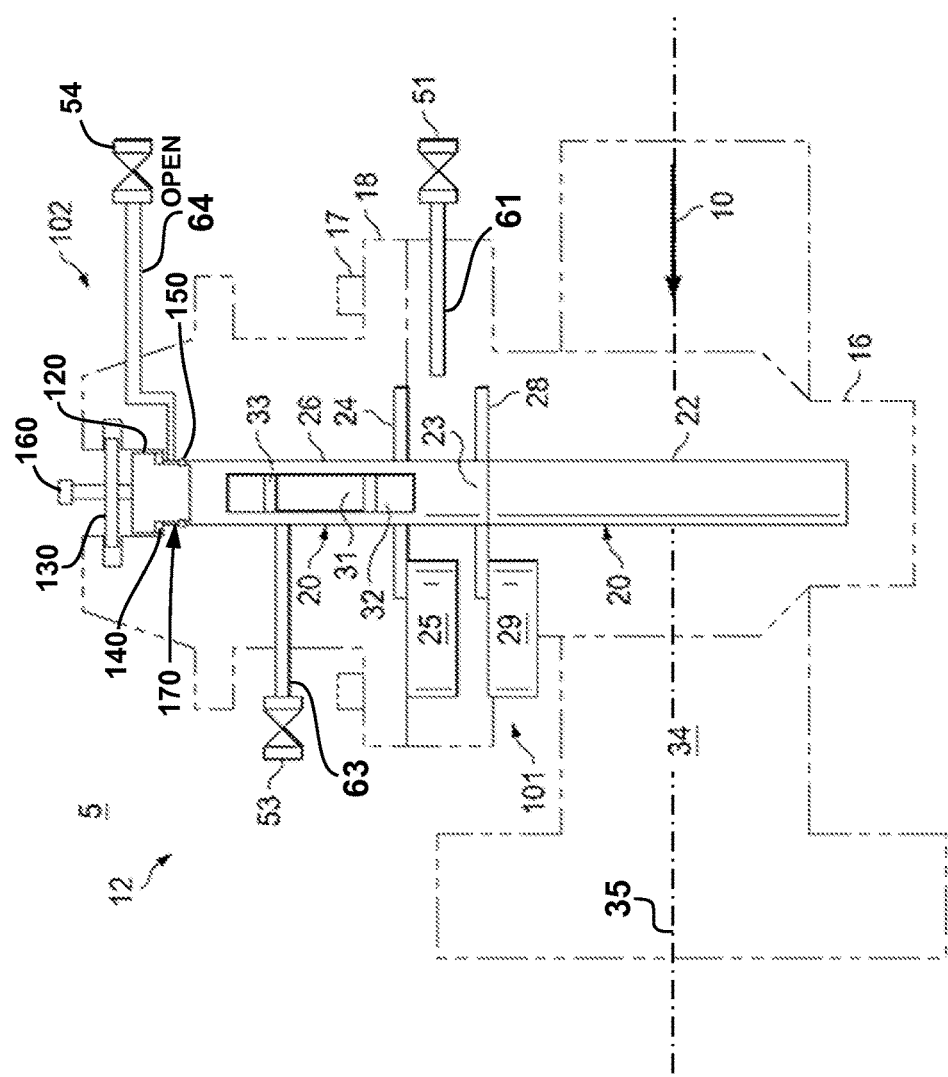
FIG. 6 is a partial sectional side view of the fitting and multi-double block and bleed system of FIG. 1 with an orifice plate positioned in an upper chamber of the fitting.
Figure 7:
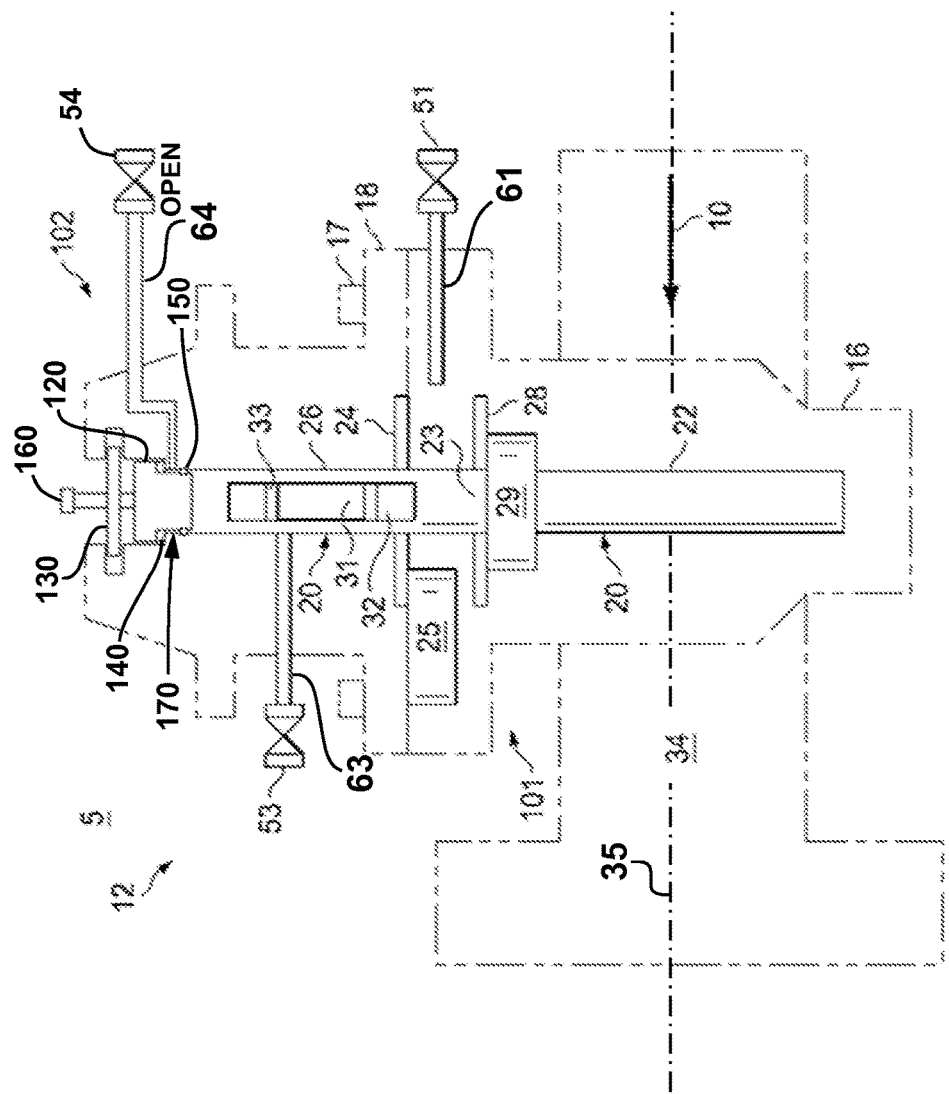
FIG. 7 is a partial sectional side view of the fitting and multi-double block and bleed system of FIG. 1 with the bottom blocking valve closed.
Figure 8:
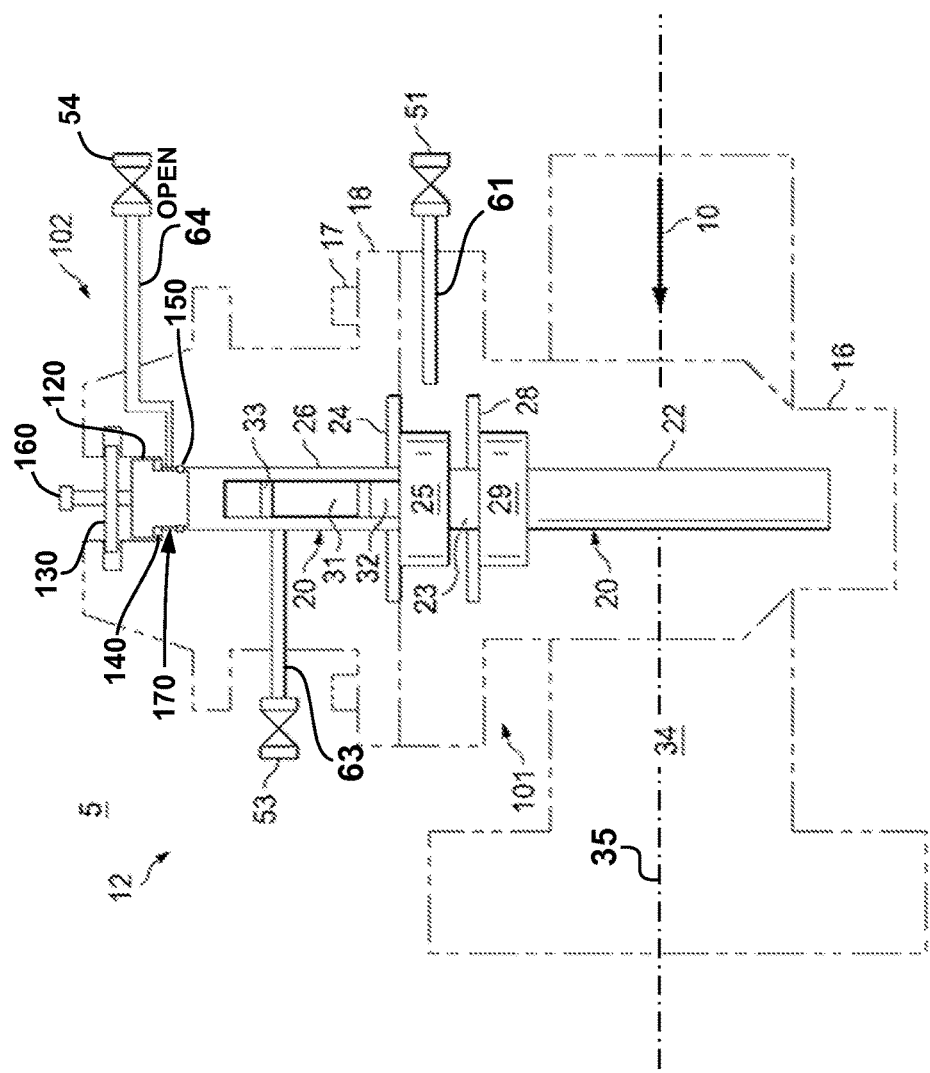
FIG. 8 is a partial sectional side view of the fitting and multi-double block and bleed system of FIG. 1 with the lower blocking valve and bottom blocking valve closed.
Figure 9:
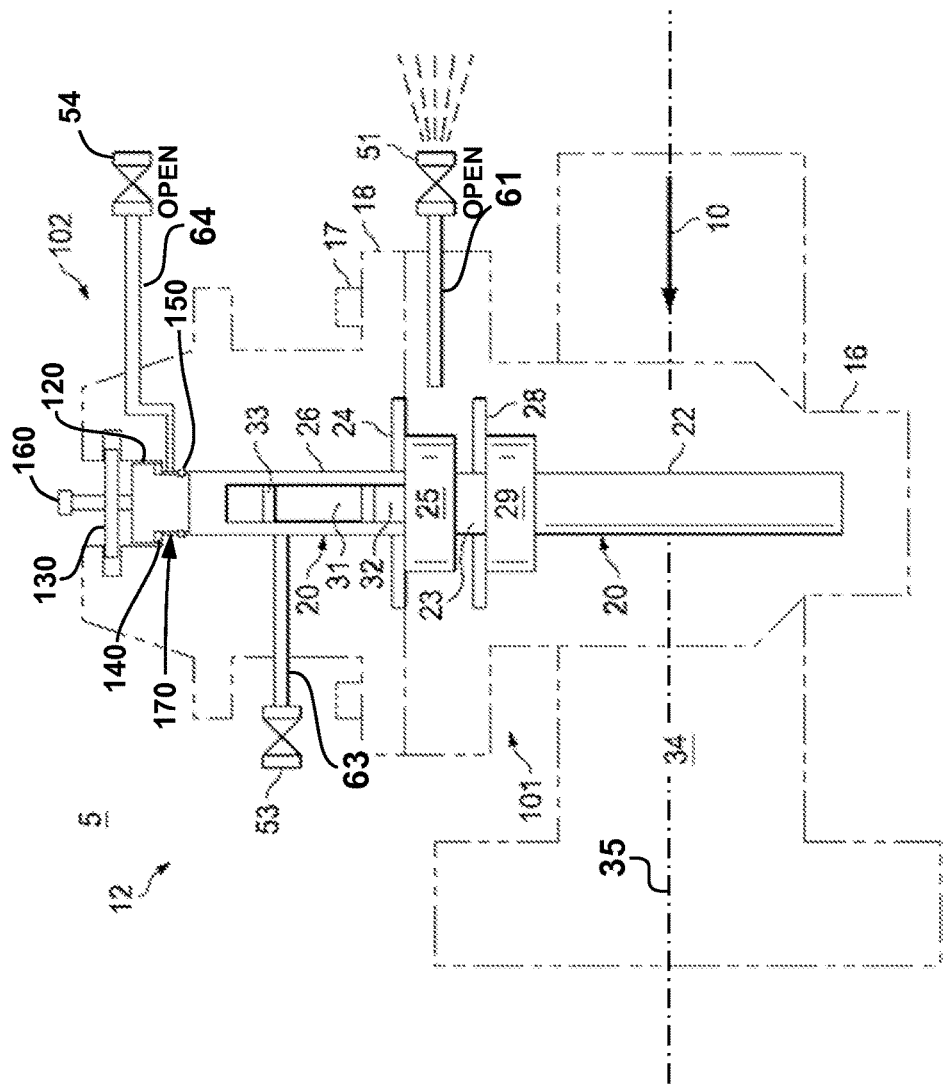
FIG. 9 is a partial sectional side view of the fitting and multi-double block and bleed system of FIG. 1 with a lower vent valve open.
Figure 10:
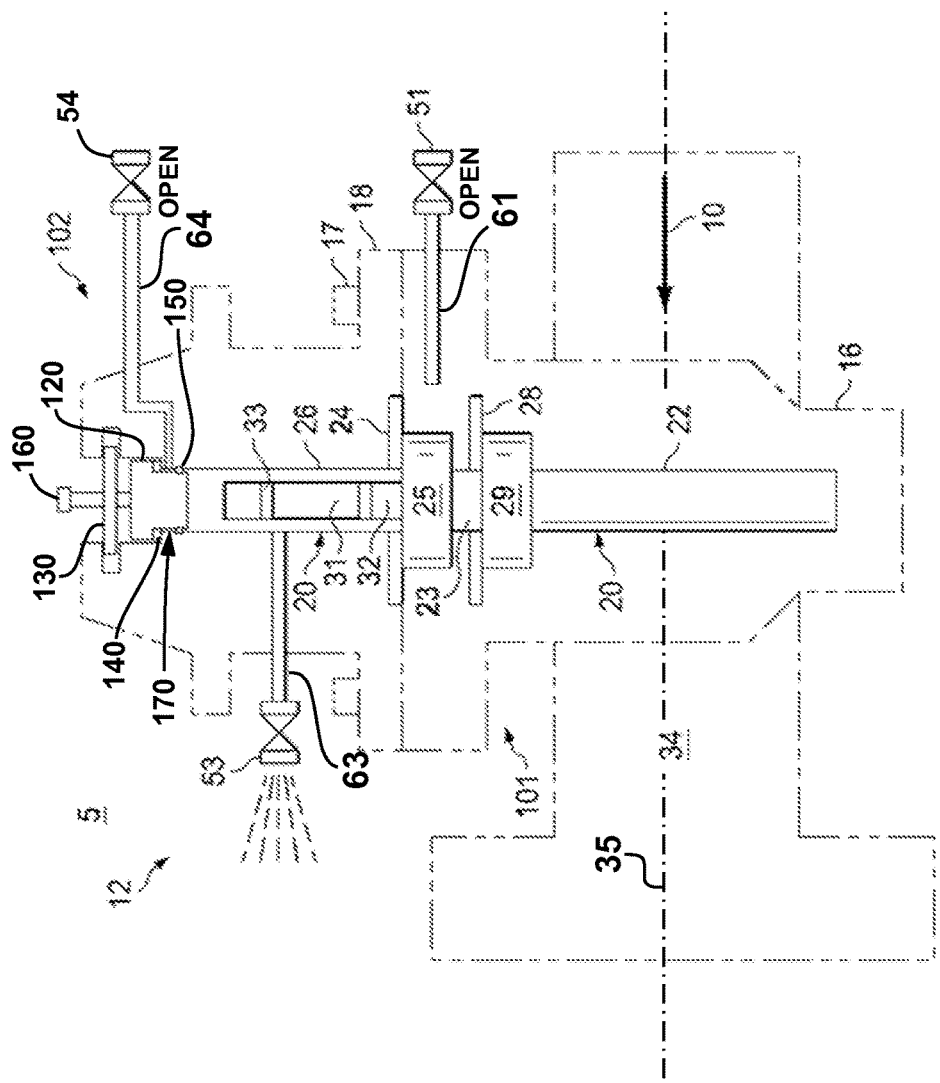
FIG. 10 is a partial sectional side view of the fitting and multi-double block and bleed system of FIG. 1 with a middle vent valve open.

Referring now to FIGS. 6-10, after valves 25, 29 are opened, the orifice plate carrier 32 and plate 33 are moved into upper chamber 26 (FIG. 6). Plate 33 and carrier 32 may be moved within chambers 22, 26 and recess 19 with a suitable drive mechanism (not shown) such as those utilized on the Dual-Chamber Orifice Fittings available from Daniel Measurement and Control of Houston, Tex. Once orifice plate carrier 32 and plate 33 is entirely within upper chamber 26 and between sealing insert 120 and lower blocking valve 25, bottom blocking valve 29 is closed (FIG. 7) followed by the closure of the lower blocking valve 25 (FIG. 8). The upper chamber 26 is thus isolated from piping section 34 and lower chamber 22. Vent valve 51 is then opened to relieve any pressure within the lower blocking valve chamber 23 between the lower and bottom blocking valves 25, 29, respectively (FIG. 9), and vent valve 53 is opened to relieve any pressure within the upper chamber 26 between the lower blocking valve 25, and upper seal assembly 102 (FIG. 10).

Figure 11:
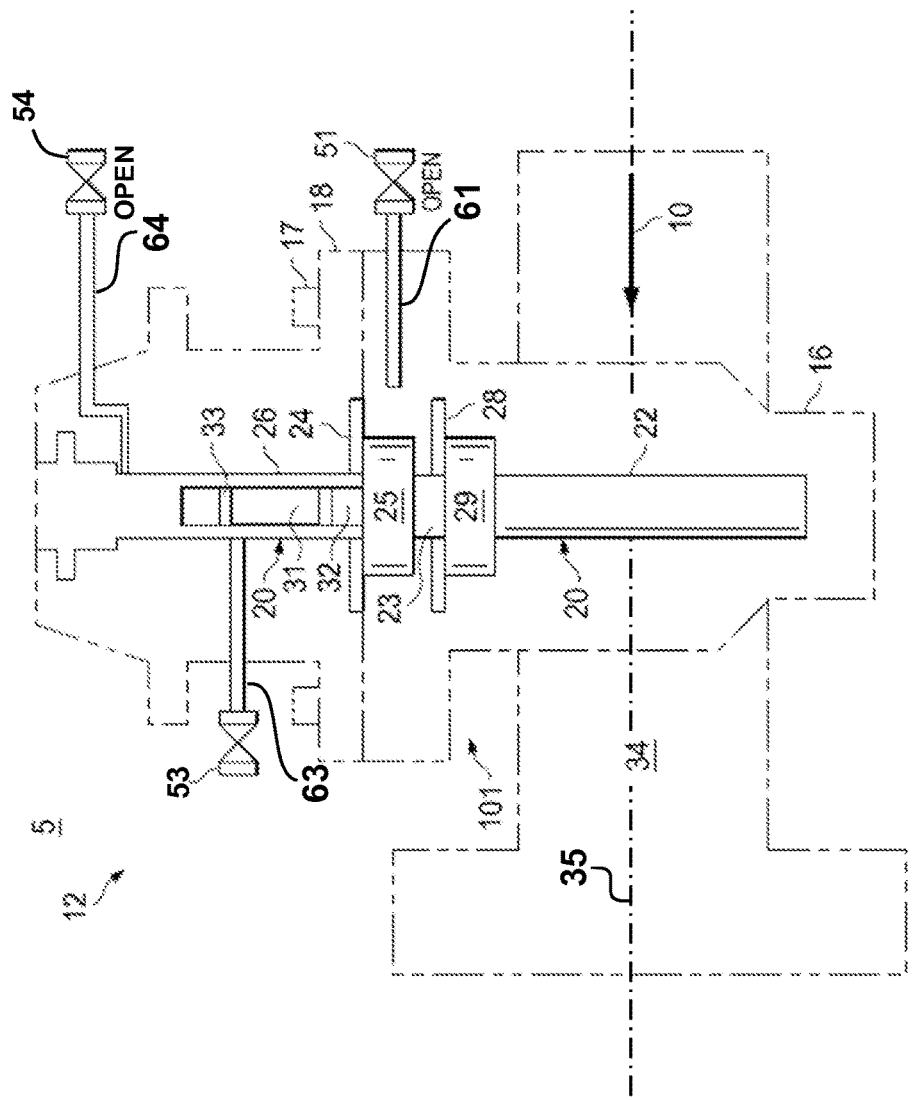
FIG. 11 is a partial sectional side view of the fitting and multi-double block and bleed system of FIG. 1 with the sealing assembly removed.
Figure 12:
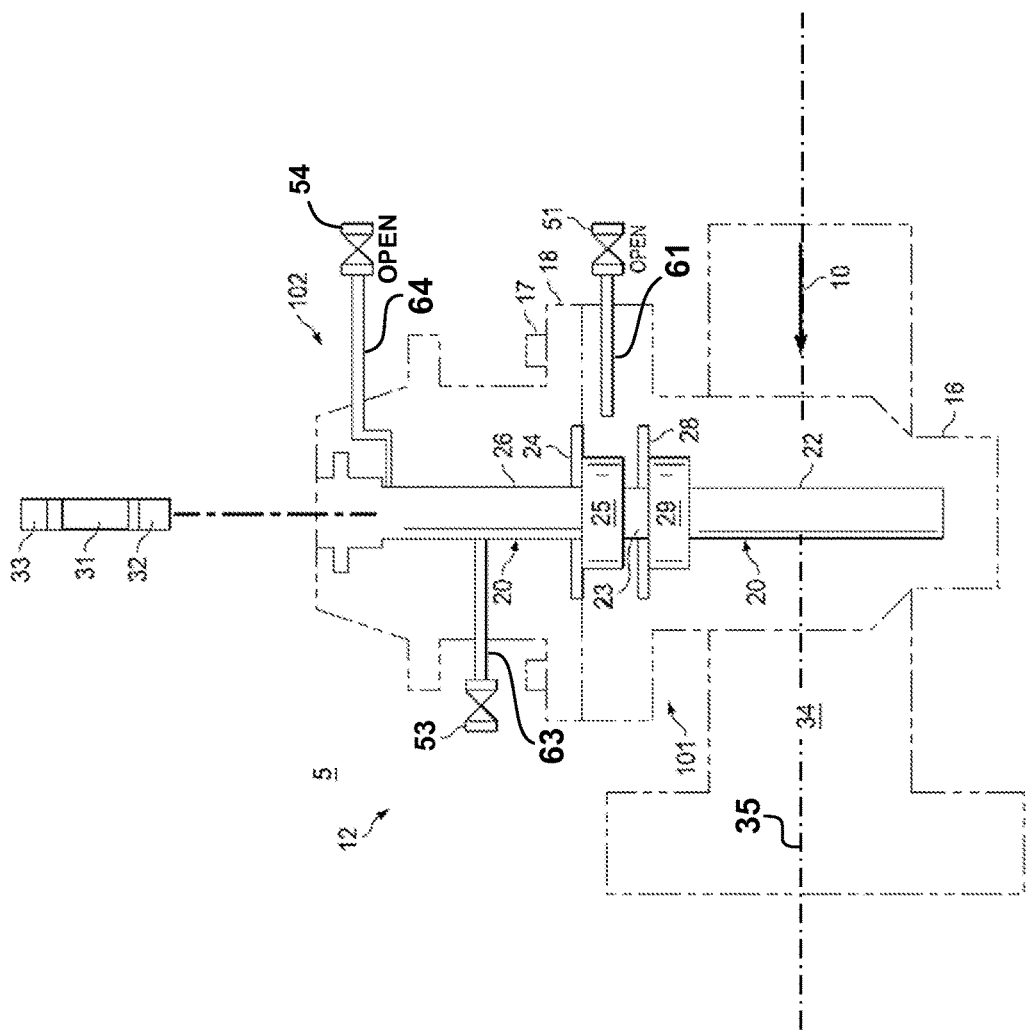
FIG. 12 is a partial sectional side view of the fitting and multi-double block and bleed system of FIG. 1 with the orifice plate removed from the fitting.
Figure 13:
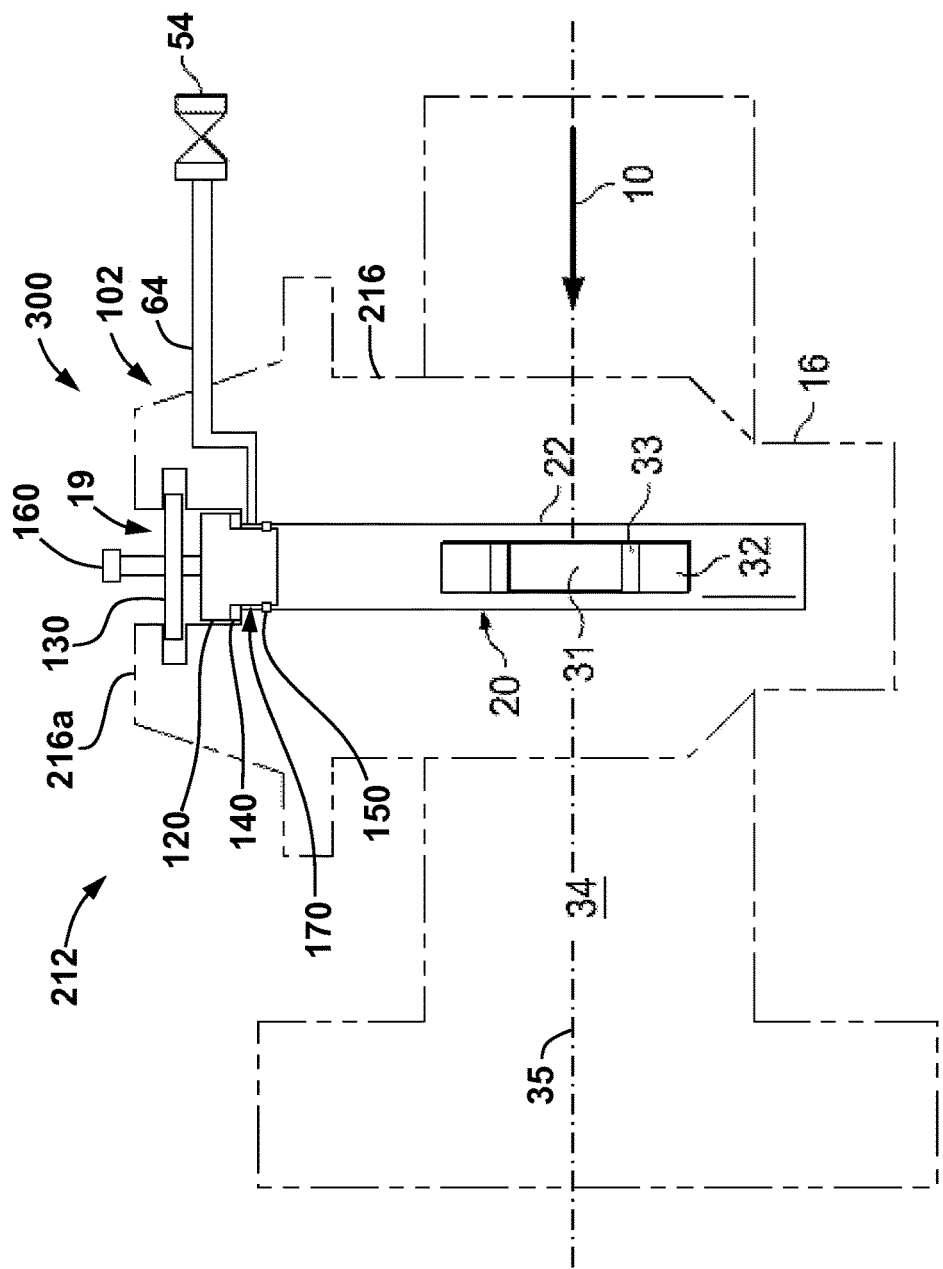
FIG. 13 is a partial sectional side view of an orifice fitting with a double block and bleed system in accordance with at least some embodiments.

Referring now to FIGS. 11-13, the middle vent valve 53 is closed (FIG. 11). In addition, the seal assembly 102 is removed from chamber 26 and recess 19 (FIG. 11). Specifically, seal assembly 102 is removed by the reverse of the operations discussed above for installation of assembly 102 (i.e., engagement members 160 are withdrawn from apertures 136 in member 130 and then member 130, insert 120, and sealing member 140 are sequentially removed from top 18). During the removal of seal assembly 102 (specifically insert 120) from top 18, the fluid tight barriers formed by members 140, 150 are disengaged or removed, thereby placing the upper chamber 26 above the lower blocking valve 25 and recess 19 in fluid communication with the environment or work area 5. However, the lower blocking valve 25 and bottom blocking valve 29 are closed, providing double block and bleed protection between the fluid flowing in the piping section 34 and the environment 5. The orifice plate carrier 32 and/or plate 33 are then removed from top 18 (FIG. 12).

To reinstall the orifice plate carrier 32 and/or orifice plate 33 (or a new orifice plate 33), vent valves 51, 52, 53, respectively, are all closed, and the previously described steps are performed in reverse order with vent valves 51, 53, 54, respectively, remaining closed during the entire process.

Therefore, in light of the description above, it should appreciated that the multi-double block and bleed system 100 provides a double block and bleed configuration during every step of the removal or installation of an orifice plate 33 in a dual chamber orifice flowmeter. Specifically, the first or lower pair of blocking valves 101 are closed and the upper seal assembly 102 is engaged within recess 19 and chamber 26, and the corresponding intervening vent valves 51, 53, 54, respectively, are opened to vent in a double block and bleed configuration during each phase of removal or installation of orifice plate 32. For example, in FIGS. 4-10, upper seal assembly 102 is inserted within recess 19 and chamber 26 such that sealing members 140, 150 are fully engaged therein, and upper vent valve 54 is open providing a double block and bleed configuration between at least the flow stream in piping section 34 and environment 5, and in some cases additional intervening valves (e.g., lower blocking valve 25 in FIG. 4; lower and bottom blocking valves 25, 29 in FIG. 10) are also closed. One can appreciate that the configuration of valves 25, 29, 51, 53, 54, insert 120, and sealing members 140, 150 represents a quadruple block and bleed configuration. Further, in FIGS. 9-12, lower blocking valve 25 and bottom blocking valve 29 are closed and lower vent valve 51 is open providing a double block and bleed configuration between the fluid flowing in piping section 34 and chamber 26 and recess 19.

While embodiments of the double block and bleed systems (e.g., system 100) disclosed herein have included dual chamber orifice flowmeters (e.g., flowmeter 12), it should be appreciated that other embodiments may be utilized in flowmeters with more or less than two chambers (e.g., chambers 22, 26) while still employing the teachings disclosed herein. For example, referring now to FIG. 13, an example of a single chamber orifice fitting or orifice flow meter 212 is shown disposed along piping section 34. In place of body 16 and top 18 on flowmeter 12 (FIG. 1), flowmeter 212 includes a body 216. Body 216 encloses the chamber 22, which in turn houses orifice plate carrier 32 and orifice plate 33 in the same manner as previously described above for flowmeter 12. In addition, body 216 includes the recess 19 extending vertically from an upper end 216a of body 216 to chamber 22. While not specifically shown in detail, a shoulder extends between recess 19 and chamber 22 in the same manner as described above for shoulder 27 (which extends between recess 19 and chamber 26 in flowmeter 12). In this embodiment, the orifice plate transfer passage 20 is more simply formed and defined by chamber 22 and recess 19.

Referring still to FIG. 13, flowmeter 212 also includes a double block and bleed system 300 in place of the system 100, previously described. System 300 includes the upper seal assembly 102, and does not include the lower blocking valves 101. As shown, upper seal assembly 102 includes the same components described above (e.g., insert 120, member 130, sealing members 140, 150, and engagement members 160) and is installed within recess 19 and chamber 22 in the same manner as described above for flowmeter, except that lower section 124 of insert 120 (e.g., see FIG. 3) is inserted within chamber 22 rather than chamber 26 (since chamber 26 has been removed). Vent valve 54 is placed in communication with the subchamber 170 formed between sealing members 140, 150 through line 64 in the same manner described above; however, it should be appreciated that for flowmeter, line 64 extends through body 216 rather than top 18 (since top 18 is not included on flowmeter 212). During operations, subchamber 170 may be monitored in the same manner described above to assess and/or determine whether a failure has occurred in either of the sealing members 140, 150. In addition, during metering operations (i.e., normal volumetric flow measurement operations), the upper seal assembly 102 provides two fluid tight barriers with sealing members 140, 150 in the manner described above, between the fluid flowing in piping section 34 and environment 5. Further, when it becomes desirable to remove plate carrier 32 and plate 33 from chamber 22, upper seal assembly 102 is simply removed from recess 19 and chamber 22 in the same manner described above, thereby providing an open path between chamber 22 and environment 5, through which plate 33 and/or carrier 32 may be removed or installed.

In the manner described, through use of a flowmeter (e.g., flowmeters 12, 212) including a double block and bleed system as disclosed herein (e.g., systems 100, 300), multiple fluid tight barriers are placed between the fluid flowing through an associated piping section (e.g., piping section 34) and the surrounding environment (e.g., environment 5). In addition, through use of an orifice flowmeter including at least some of the embodiments of the double block and bleed system as disclosed herein, the orifice plate and or plate carrier (e.g., plate 33 and carrier 32) may be removed while maintaining at least two barriers between the fluid flowing in the adjacent piping section (e.g., piping section 34) and the outer environment (e.g., environment 5).

While at least some embodiments disclosed herein have included a pair of lower blocking valves 101 below upper sealing assembly 102, other embodiments include a double sealing valve 301 in place of valves 101. For example, referring now to FIG. 15, another example of a dual chamber orifice fitting or orifice flowmeter 312 is shown disposed along piping section 34. Flowmeter 312 is substantially the same as flow meter 12 previously described. As a result, like components are given like reference numbers and the discussion below will concentrate on the differences of flowmeter 312 in light of flowmeter 12. Specifically, in this embodiment, flowmeter 312 includes a double seal valve 301 disposed below upper seal assembly 102 along orifice plate transfer passage 20 in place of the pair of lower blocking valves 101 of flowmeter 12.

Figure 15:
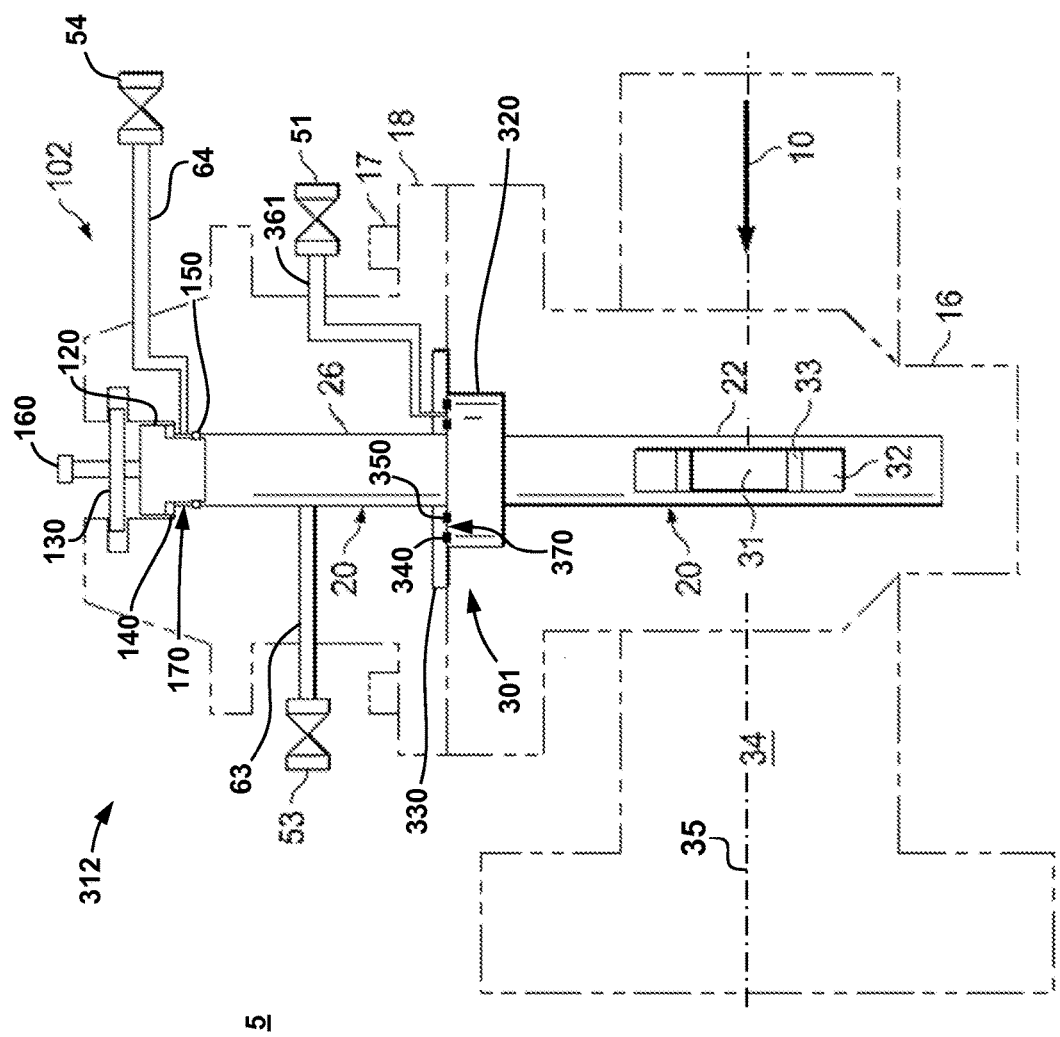
FIG. 15 is a partial sectional side view of an orifice fitting with a multi-double block and bleed system including a double seal valve in accordance with at least some embodiments.
Figure 16:
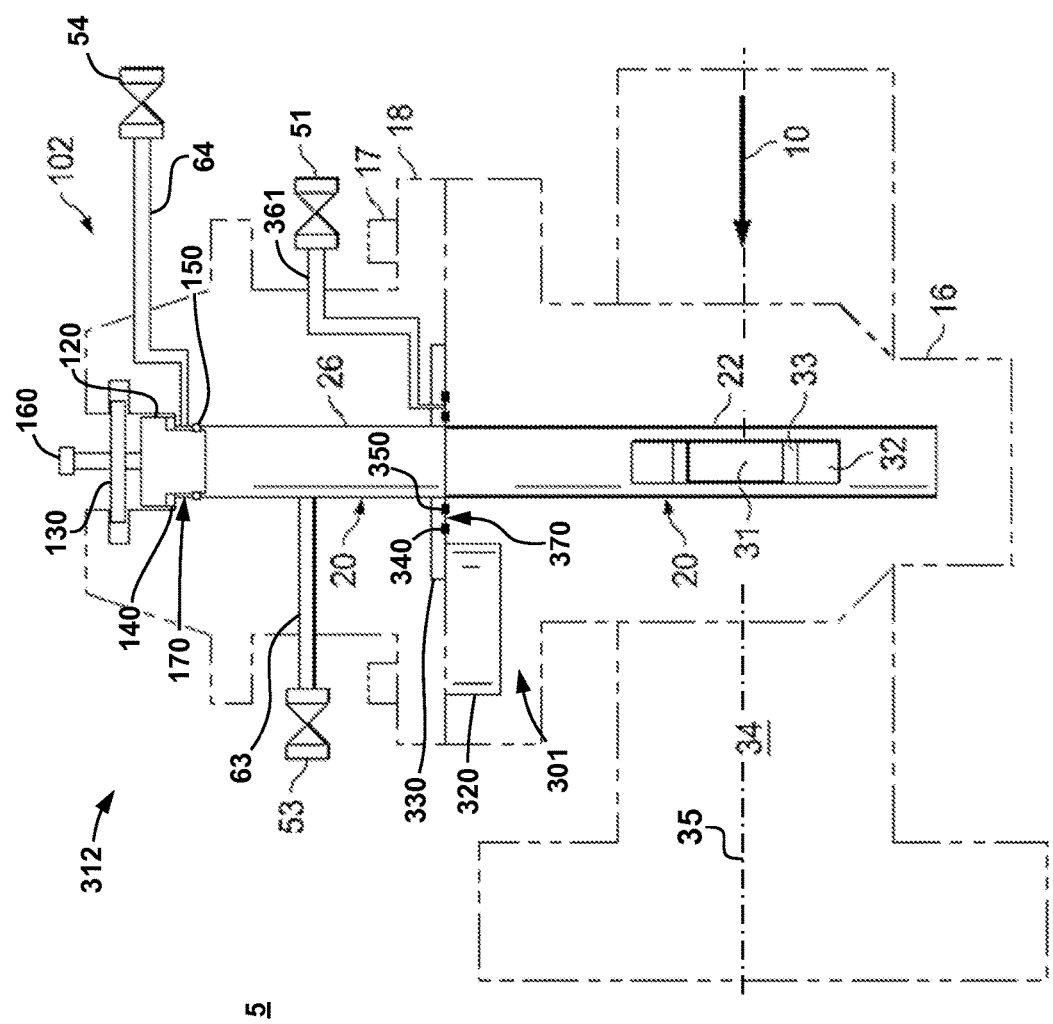
FIG. 16 is a partial sectional side view of the orifice fitting of FIG. 15 showing the double seal valve in an open position.

Referring now to FIGS. 15 and 16, double seal valve 301 generally includes a valve seat 330, and a movable valve member 320. Valve member 320 is actuatable relative to valve seat 330 between a closed position as shown in FIG. 15 and an open position as is shown in FIG. 16. When valve member 320 is in the closed position of FIG. 15, it blocks or prevents the fluid flowing in piping section 34 from advancing beyond valve 301 within upper chamber 26. Conversely, when valve member 320 is in the open position of FIG. 16, it allows free flow of fluid from piping section 34 to upper chamber 26. As one of ordinary skill will appreciate, valve member 320 slidably actuated by rotating gear one or more shafts (not shown) such as those used in the Dual-Chamber Orifice Fittings available from Daniel Measurement and Control of Houston, Tex.

Figure 17:
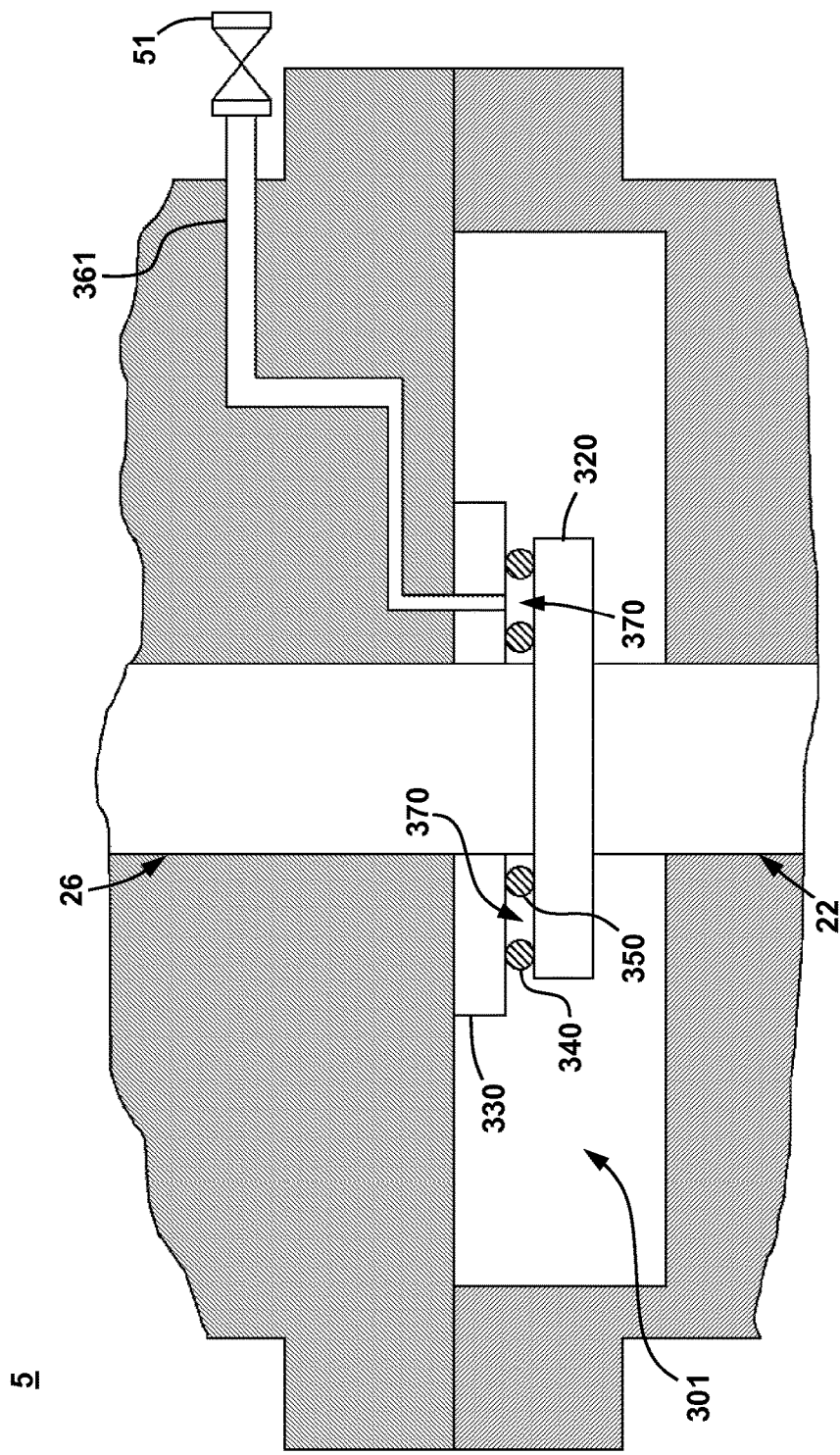
FIG. 17 is an enlarged cross-sectional view of the double seal valve of the orifice fitting of FIG. 15.

Referring now to FIG. 17, valve 301 also includes a first sealing member 340 and a second sealing member 350. Sealing members 340, 350 are each annular members that are mounted to valve seat 330 such that they each sealingly engage with valve member 320 when valve member 320 is in the closed position (e.g., the position shown in FIGS. 15 and 17). In addition, first sealing member 340 is spaced from second sealing member 350 such that when valve member 320 is disposed in the closed position (e.g., FIG. 15), a sealed annular subchamber 370 is formed between sealing members 340, 350 and between valve seat 330 and valve member 320. Lower vent valve 51 is placed in communication with subcamber 370 through line 361 such that subchamber 370 is selectively placed in fluid communication with outer environment 5 via line 361 and valve 51 during operations. Sealing members 340, 350 may comprise any suitable annular sealing member for providing a seal between valve seat 330 and valve member 320. In some embodiments, one or both of the sealing members 340, 350 are O-rings; however, in other embodiments, one or both of the sealing members 340, 350 are gaskets. In addition, sealing members 340, 350 may be constructed out of any suitable material for creating a fluid tight seal when compressed between two other rigid surfaces. For example, in some embodiments, sealing members 340, 350 may comprise an elastomer, a polymer, graphite, metals (soft or hard).

Referring again to FIGS. 15 and 16, during operations, when it becomes desirable to remove orifice plate 33, double sealing valve 301 is opened by transitioning the valve member 320 from the closed position (FIG. 15) to the open position (FIG. 16). Thereafter, plate 33 is transitioned from lower chamber 22 to upper chamber 26 in the manner described above, and valve member 320 is transitioned back from the open position (FIG. 16) to the closed position (FIG. 15). Vent valve 51 is then opened to relieve any pressure within subchamber 370. Following the bleeding of subchamber 370, the remaining steps in the removal operation of orifice plate 33 are the same as that described above and specifically as shown in FIGS. 10-12, except that closed valves 25, 29 are replaced with closed valve 301. As a result, a specific description of these remaining steps is omitted. An advantage of flowmeter 312 is that the pair of blocking valves 101 are functionally replaced with a single blocking valve (e.g., valve 301). As a result, the total number of components required to construct flowmeter 312 are further reduced, which thereby further increases reliability and decreases manufacturing costs.

Figure 14:
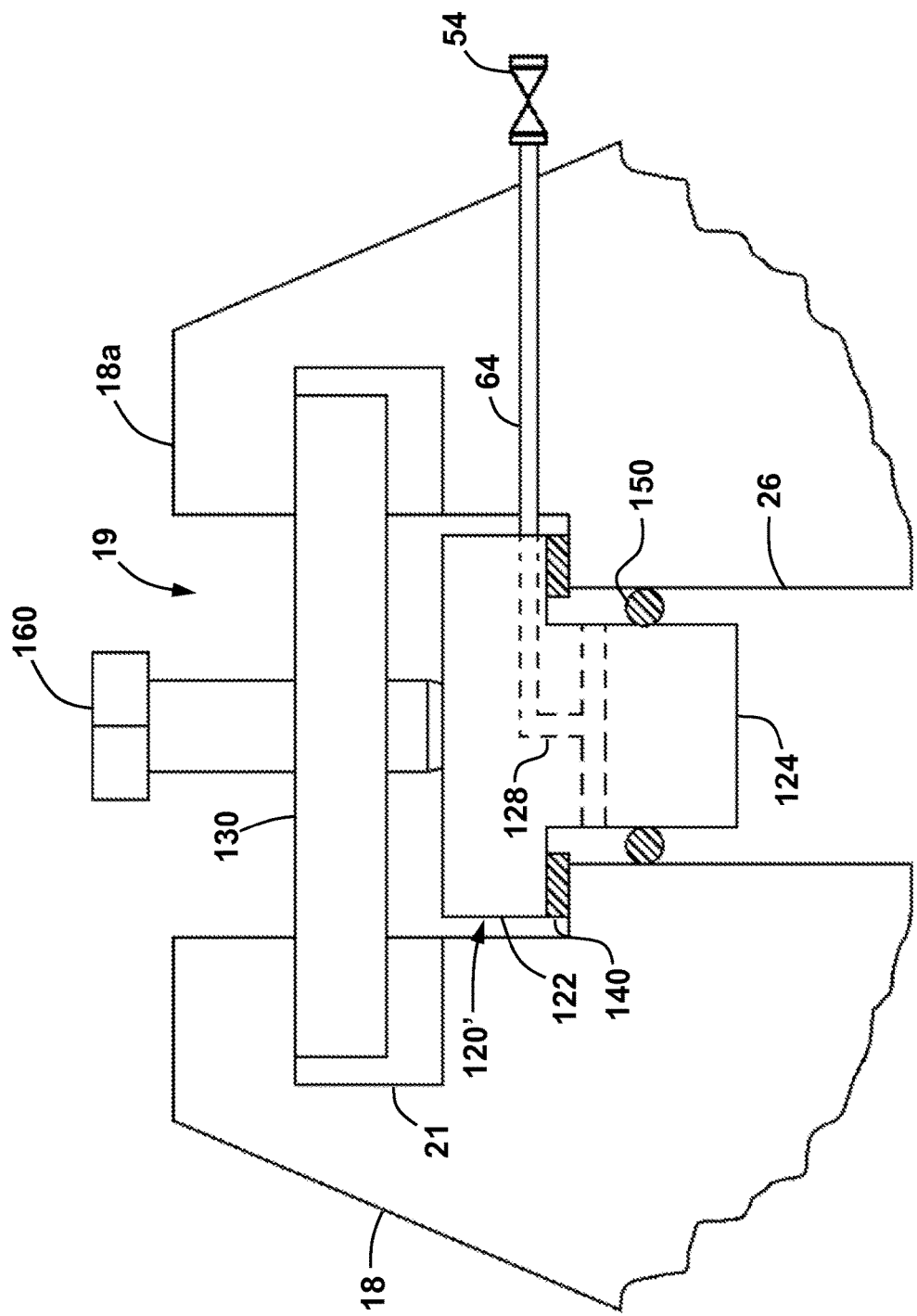
FIG. 14 is an enlarged partial sectional side view of an embodiment of the upper seal assembly of the multi-double block and bleed system of FIG. 1.

Still further embodiments are contemplated. For example, while embodiments of seal insert 120 have been described to comprise a solid component, it should be appreciated that in other embodiments, seal insert 120 may include one or more internal chambers or flow paths to place subchamber 170 in communication with upper vent valve 54. Specifically, referring now to FIG. 14, where an embodiment of seal insert 120' is shown. Seal insert 120' is substantially the same as seal insert 120, previously described, except that seal insert 120' includes an internal flow path 128 extending through each of the upper section 122 and lower section 124 to place subchamber 170 in fluid communication with vent valve 54. In some embodiments, vent valve 54 may be mounted direct to insert 120' and fluidly connected to internal flow path 128 thereby potentially simplifying the sealing assembly 102 by eliminating the need to place an internal flow path (e.g., line 64 through top 18).

While numerous exemplary embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the invention. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. An orifice fitting, comprising:
a body;
an orifice plate mounted in the body;
an orifice plate transfer passage within the body, the orifice plate transfer passage including a shoulder, and wherein the orifice plate is movable through the orifice plate transfer passage;
a sealing assembly disposed in the orifice plate transfer passage, the sealing assembly comprising:
a sealing insert including a first section and a second section, wherein the sealing insert includes an internal flow passage routed through at least one of the first section and the second section;
a first sealing member configured to create a first fluid tight barrier between the shoulder and the first section;
a second sealing member configured to create a second fluid tight barrier between the second section and the orifice plate transfer passage;
a subchamber within the orifice plate transfer passage between the first fluid tight barrier and the second fluid tight barrier; and
a first vent valve in communication with the internal flow passage of the sealing insert.

2. The system of claim 1, wherein the first vent valve is in communication with the subchamber, and configured to provide an outlet for fluid in the subchamber.

3. The system of claim 1, further comprising:
a clamping plate that is insertable within a slot formed in the orifice plate transfer passage;
wherein the clamping plate includes an aperture extending therethrough; and
an engagement member configured to be threadably engaged within the aperture, wherein the engagement member has an end that is configured to engage with the sealing insert;
the clamping plate, the engagement member, and the sealing insert being configured such that advancement of the engagement member through the aperture causes engagement of the end of the engagement member with the sealing insert and compression the first sealing member between the shoulder and the first section.

4. The system of claim 1, wherein the first sealing member comprises a gasket including a first planar surface and a second planar surface opposite the first planar surface.

5. The system of claim 1, further comprising a blocking valve disposed in the orifice plate transfer passage apart from the sealing assembly, wherein the blocking valve comprises:
a valve seat;
a valve member movable between a closed position to restrict movement of an orifice plate along the orifice plate transfer passage past the blocking valve and an open position to allow the orifice plate to advance through the orifice plate transfer passage past the blocking valve;
a third sealing member; and
a fourth sealing member;
wherein the third sealing member and the fourth sealing member sealingly engage both the valve seat and the valve member when the valve member is in the closed position to define a second subchamber between the valve seat and the valve member extending between the third sealing member and the fourth sealing member.

6. The sealing system of claim 5, further comprising a second vent valve in communication with the second subchamber, wherein the second vent valve is configured to provide an outlet for fluid in the second subchamber.

7. The system of claim 1, further comprising a pair of blocking valves disposed in series in the orifice plate transfer passage apart from the sealing assembly, wherein each of the blocking valves is configured to block a flow of fluid from the fitting through the orifice plate transfer passage; wherein a chamber is defined in the orifice plate transfer passage between the pair of blocking valves.

8. The system of claim 7, wherein the pair of blocking valves are openable to allow an orifice plate to advance through the orifice plate transfer passage past the pair of blocking valves.

9. The system of claim 7, further comprising a second vent valve in communication with the chamber between the pair of blocking valves, wherein the second vent valve is configured to provide an outlet for fluid in the chamber between the pair of blocking valves.

10. The system of claim 9, further comprising a third vent valve in communication with the orifice plate transfer passage between the sealing assembly and the pair of blocking valves, wherein the third vent valve is configured to provide an outlet for fluid in the orifice plate transfer passage between the sealing assembly and the pair of blocking valves.

11. An orifice fitting, comprising:
a body including an orifice plate transfer passage extending therein;

an orifice plate disposed within the orifice plate transfer passage;

a sealing insert disposed in the orifice plate transfer passage;

a pair of fluid tight barriers within the orifice plate transfer passage that are configured to restrict a flow of fluid from the orifice fitting along the orifice plate transfer passage;

a subchamber defined within the orifice plate transfer passage between the pair of fluid tight barriers; and a first vent valve in communication with the subchamber and configured to provide an outlet for fluid in the subchamber;

wherein one of the pair of fluid tight barriers is formed between a side surface of the sealing insert and an inner surface of the orifice plate transfer passage;

wherein the sealing insert includes an internal flow passage, wherein the first vent valve is in communication with the internal flow passage.

12. The orifice fitting of claim 11, wherein the sealing insert includes a first section and a second section;

wherein the orifice plate transfer passage includes a shoulder; and a first sealing member disposed between the first section of the sealing insert and the shoulder forming a first of the pair of fluid tight barriers; and a second sealing member disposed between the second section of the sealing insert and the inner surface of the orifice plate transfer passage forming a second of the pair of fluid tight barriers.

13. The orifice fitting of claim 12, wherein the first sealing member is a gasket including a first planar surface and a second planar surface opposite the first planar surface.

14. The orifice fitting of claim 11, further comprising a pair of blocking valves disposed in series in the orifice plate transfer passage apart from the sealing insert, wherein each of the pair of blocking valves is configured to block a flow of fluid from the orifice fitting through the orifice plate transfer passage; wherein a chamber is defined in the orifice plate transfer passage between the pair of blocking valves.

15. The orifice fitting of claim 14, further comprising a second vent valve in communication with the chamber between the pair of blocking valves, and configured to provide an outlet for fluid in the chamber between the pair of blocking valves.

16. The orifice fitting of claim 15, wherein the pair of blocking valves are openable to allow an orifice plate to advance through the orifice plate transfer passage past the pair of blocking valves.

17. The orifice fitting of claim 15, further comprising a third vent valve in communication with the orifice plate transfer passage between the sealing insert and the pair of blocking valves, and configured to provide an outlet for fluid in the orifice plate transfer passage between the sealing insert and the pair of blocking valves.

18. The orifice fitting of claim 17, further comprising:

a clamping plate that is insertable within a slot formed in the orifice plate transfer passage;

wherein the clamping plate includes an aperture extending therethrough; and an engagement member configured to be threadably engaged within the aperture, wherein the engagement member has an end that is configured to engage with the sealing insert;

the clamping plate, the engagement member, and the sealing insert being configured such that advancement of the engagement member through the aperture causes engagement of the end of the engagement member with the sealing insert and compression the first sealing member between the shoulder and the first section.

* * * * *

UNITED STATES PATENT AND TRADEMARK OFFICE
CERTIFICATE OF CORRECTION

PATENT NO. : 10,317,003 B2  
APPLICATION NO. : 14/806368  
DATED : June 11, 2019  
INVENTOR(S) : Loga et al.

Page 1 of 1

It is certified that error appears in the above-identified patent and that said Letters Patent is hereby corrected as shown below:

In the Claims

Column 11, Claim 2, Line 1: Replace "system" with "orifice fitting"

Column 12, Claim 3, Line 1: Replace "system" with "orifice fitting"

Column 12, Claim 3, Line 14: After "compression" insert --of--

Column 12, Claim 4, Line 1: Replace "system" with "orifice fitting"

Column 12, Claim 5, Line 1: Replace "system" with "orifice fitting"

Column 12, Claim 6, Line 1: Replace "sealing system" with "orifice fitting"

Column 12, Claim 7, Line 1: Replace "system" with "orifice fitting"

Column 12, Claim 8, Line 1: Replace "system" with "orifice fitting"

Column 12, Claim 8, Line 2: Replace "are" with "is"

Column 12, Claim 9, Line 1: Replace "system" with "orifice fitting"

Column 12, Claim 10, Line 1: Replace "system" with "orifice fitting"

Column 13, Claim 11, Line 6: Replace "are" with "is"

Column 14, Claim 16, Line 2: Replace "are" with "is"

Column 14, Claim 18, Line 14: After "compression" insert --of--

Signed and Sealed this  
Twenty-eighth Day of February, 2023

Katherine Kelly Vidal  
*Director of the United States Patent and Trademark Office*